(12) United States Patent
Soi

(10) Patent No.: US 8,912,292 B2
(45) Date of Patent: Dec. 16, 2014

(54) METHOD TO PRODUCE COPOLYMERS OF TETRAHYDROFURAN AND EPOXIDISED NATURAL OILS

(71) Applicant: Hoong Seng Soi, Selangor (MY)

(72) Inventor: Hoong Seng Soi, Selangor (MY)

(73) Assignee: Malaysian Palm Oil Board, Selangor (MY)

( * ) Notice: Subject to any disclaimer, the term of this patent is extended or adjusted under 35 U.S.C. 154(b) by 118 days.

(21) Appl. No.: 13/667,247

(22) Filed: Nov. 2, 2012

(65) Prior Publication Data

US 2013/0116402 A1 May 9, 2013

(30) Foreign Application Priority Data

Nov. 3, 2011 (MY) .............................. PI2011005310

(51) Int. Cl.
*C08G 65/26* (2006.01)
(52) U.S. Cl.
CPC ...................................... *C08G 65/26* (2013.01)
USPC ........................................................ 525/454
(58) Field of Classification Search
CPC ................................ C08G 65/22; C08G 65/20
USPC ........................................................ 525/454
See application file for complete search history.

(56) References Cited

U.S. PATENT DOCUMENTS

| | | | | |
|---|---|---|---|---|
| 3,354,133 A * | 11/1967 | Hsich | ............................... | 528/45 |
| 4,826,944 A * | 5/1989 | Hoefer et al. | ................... | 528/49 |
| 5,180,856 A * | 1/1993 | Stehr et al. | .................... | 568/617 |
| 5,773,648 A | 6/1998 | Becker et al. | | |
| 6,077,932 A * | 6/2000 | Reich et al. | .................... | 528/403 |
| 6,355,310 B1 * | 3/2002 | Saint Victor | ................... | 427/498 |
| 6,420,443 B1 * | 7/2002 | Clark et al. | .................... | 521/114 |
| 6,602,602 B1 * | 8/2003 | Crivello | ......................... | 428/402 |
| 2004/0134604 A1 * | 7/2004 | Oxman et al. | ............. | 156/275.5 |
| 2009/0239964 A1 * | 9/2009 | Sasaki et al. | .................. | 521/117 |
| 2009/0286896 A1 * | 11/2009 | Roh et al. | ....................... | 521/159 |
| 2009/0306239 A1 * | 12/2009 | Mijolovic et al. | ............. | 521/172 |
| 2010/0048935 A1 * | 2/2010 | Mijolovic et al. | ............. | 558/276 |
| 2010/0144969 A1 * | 6/2010 | Coates et al. | ................... | 525/55 |
| 2011/0039968 A1 * | 2/2011 | Vairo | ............................. | 521/170 |
| 2012/0277338 A1 * | 11/2012 | Kaplan et al. | ................. | 521/157 |
| 2013/0131302 A1 * | 5/2013 | Suppes et al. | .................... | 528/85 |

OTHER PUBLICATIONS

Feng et al., "Copolymerization of tetrahydrofuran and propylene oxide", Plymer Bulletin 24, p. 507-512, 1990.

* cited by examiner

*Primary Examiner* — Mike M Dollinger
(74) *Attorney, Agent, or Firm* — Workman Nydegger

(57) ABSTRACT

The invention relates to a method to produce polytetrahydrofuran (PTHF) copolymer from plant oil by copolymerizing epoxidized oil; preferably from natural sources like animal oils and more preferably from plants oils; with tetrahydrofuran (THF), in the presence of boron trifluoride-diethylether complex or tetrafluoroboric acid to yield the desired copolymer with specific properties. The properties of the produced PTHF copolymer depends on the (i) type of epoxidized oil used as co-monomer (ii) mole ratio between epoxidized oil and THF (iii) amount of catalyst (iv) reaction temperature (v) reaction time. The produced PTHF copolymers were then used as raw material for the production of polyurethane and polyurea.

18 Claims, No Drawings

METHOD TO PRODUCE COPOLYMERS OF TETRAHYDROFURAN AND EPOXIDISED NATURAL OILS

FIELD OF INVENTION

The present invention relates to a method to produce copolymers of tetrahydrofuran and epoxidized natural oils through ring opening polymerization in the presence of a catalyst conducted to yield the desired copolymer.

BACKGROUND ART

Copolymers of tetrahydrofuran (hereinafter referred to as "THF"), in this case polytetrahydrofuran (hereinafter referred to as "PTHF"); is a polymer with diol functionality that is used as an intermediate for the preparation of polyurethane, polyester and polyamide elastomers. Incorporation of PTHF into these polymers imparts softness and flexibility to these polymers.

PTHF is made from THF through cationic ring opening polymerization in the presence of a catalyst. Becker et al in U.S. Pat. No. 5,773,648 has disclosed that the catalyst used in the process for cationic ring opening polymerization are strong Lewis acids (boron trichloride, aluminium trichloride, iron trichloride and tin tetrachloride) and strong Bronsted acids (tetrafluoroboric acid, fluorosulfonic acid, perchloric acid and chlorosulfonic acid). Heterogeneous catalysts used in the process are zeolite, ammonium paratungstate supported on titanium dioxide, Nafion ion exchange resin, sulfate doped zirconium oxide and bleaching earth.

Additionally, it has been reported by Feng et al in *Polymer Bulletin* (1990) that copolymerization of THF with cyclic ethers such as ethylene oxide and propylene oxide was conducted to impart specific properties to the polymer such as lower crystallinity that will yield lower temperature flexibility to the polymer. The incorporation of cyclic ethers also makes the polymer more hydrophilic that is desired for specific application.

Currently, all the feedstock for the production of PTHF, namely THF, ethylene oxide and propylene oxide are originated from petroleum-based chemicals. However, due to rising cost of crude oil and environmental concerns, there are interests in producing PTHF with incorporated renewable content. To date, there is no report of PTHF made with copolymerizing THF with renewable cyclic ethers such as epoxidized natural oils. Therefore, it is an objective of this invention to polymerize THF with a renewable co-monomer, namely epoxidized natural oils. The most fundamental difference in method of producing copolymers (PTHF) disclosed in this invention is the use of epoxidized oil from natural sources (like palm oil) as the co-monomer in polymerization of THF.

The produced copolymers PTHF were then used as raw material for the production of polyurethane and polyurea.

SUMMARY OF INVENTION

One aspect of the present invention is to provide a method to produce PTHF from epoxidized oil and THF.

A preferred aspect is when the epoxidized oil used to produce the PTHF is obtained from natural sources like animals and most preferably plants.

In another aspect of the invention is to provide a method where PTHF is reacted with excess diisocyanate to produce isocyanate terminated prepolymer and subsequently the said prepolymer is reacted with diol or diamine to produce polyurethane and polyurea respectively.

The present invention consists of features and a combination of parts hereinafter fully described and illustrated in the accompanying drawings, it being understood that various changes in the details may be made without departing from the scope of the invention or sacrificing any of the advantages of the present invention.

DETAILED DESCRIPTION OF THE PREFERRED EMBODIMENTS

The present invention relates to a method to produce copolymers of tetrahydrofuran and epoxidized natural oils through ring opening polymerization in the presence of a catalyst to yield the desired polymer and consequently using the prepared PTHF to produce polyurethane and polyurea. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The present invention relates to a process for producing copolymers of THF and epoxidized oil with boron trifluoride-diethylether complex or tetrafluoroboric acid as the catalyst.

The term "epoxidized oil" used throughout the specification herein refers to both unsaturated oil and unsaturated fat derived from natural source like animals and plants. Any epoxidized oil made from unsaturated oil can be employed in the disclosed process for producing the PTHF. For example, but not limited to, epoxidized oil made from palm oil, palm olein, palm stearin, soybean oil, coconut oil, groundnut oil, safflower oil, linseed oil, corn oil, sunflower oil, olive oil, canola oil, cottonseed oil, rapeseed oil, tung oil, fish oil, lard, tallow, euphorbia oil, vernonia oil and any derivatives thereof such as fatty acid methyl ester. Furthermore, it is possible to mix plurality types of unsaturated oil to produce PTHF possessing the desired properties such as low viscosity or high functionality which can be applied then for different applications. In addition, natural occurring plant oils that have epoxy functionality such as euphorbia oil and vernonia oil can also be used as co-monomer in the present invention.

Attention is now turned to the preparation of epoxidized oil from unsaturated plant oil. Any per-acid or peroxyacids or combination of peroxyacids can be employed to epoxidized the unsaturated oil. Representative examples, but not limited to, are peroxyformic acid, peroxyacetic acid, trifluoroperoxyacetic acid, benzyloxyperoxyformic acid, 3,5-dinitroperoxybenzoic acid, and m,-chloroperoxybenzoic acid. The peroxyacids can be preformed before reacting with the unsaturated oil or prepared in-situ in the reactor where the epoxidation process being carried out.

Furthermore, the epoxidized oil can be prepared from unsaturated oil by using transition metal based catalyst such as molybdenum and tungsten in combination with a phase transfer catalyst and hydrogen peroxide. Representative examples of molybdenum and tungsten based catalyst, but not limited to, are oxoperoxo(pyridine-2,6-dicarboxylato) molybdenum (VI) hydrate, tungsten powder, tungstic acid, sodium tungstate, peroxophosphotungstate complexes such as dodecylphosphonato-peroxotungstic acid tetrabutylammonium salt and methyltrioctylammonium tetrakis (diperoxotungsto) phosphates. Examples of phase transfer catalysis that can be used are Adogen 464 and Aliquat 336.

Preferably, the epoxidized oil used in the invention should be neutral with pH between 6.5 and 7.5 and the moisture content of the epoxidized oil should be below 0.1%. The oxirane oxygen content (OOC %) of the epoxidized oil should be at least 1.5% and could be as high as 7%.

The THF used as a reactant in this invention can be any of those commercially available. Typically, the THF has a maximum water content of 0.1% by weight and a peroxide content of less than 0.015%.

The epoxidized oils were dissolved in THF in a ratio of 1:1 (w/v) to 1:100 (w/v) depending on the types of epoxidized oil as well as the desired properties of the end product. For example, epoxidized oil with one epoxy functionality, the ratio 1:5 to 1:20 (w/v) was used. While, for epoxidized oil with two epoxy functionality, the ratio 1:10 to 1:50 (w/v) was used and for epoxidized oil with three or more epoxy functionality, the ratio 1:50 to 1:100 (w/v) was used.

In the present invention, the co-polymerization of THF and epoxidized oil was conducted in the presence of catalyst. The chemical compounds that could be used as the catalyst for this process are strong Lewis acids (boron trichloride, aluminium trichloride, iron trichloride and tin tetrachloride) and strong Bronsted acids (tetrafluoroboric acid fluorosulfonic acid, perchloric acid and chlorosulfonic acid).

In addition, heterogeneous catalysts that could be used in the process are zeolite, ammonium paratungstate supported on titanium dioxide, Nafion ion exchange resin, sulfate doped zirconium oxide and bleaching earth. However, for the purpose of the present invention, the preferred catalysts are boron trifluoride-diethylether complex ($BF_3.Et_2O$, 48% in diethyl ether) and tetrafluoroboric acid ($HBF_4$, 48% in water).

It is well known in the art that higher catalyst concentration tends to cause undesired side reaction such as transesterification and giving cross-linked products that were insoluble in most solvents. The amount of $BF_3.Et_2O$ used in this invention preferably ranges from 0.01 mole to 0.1 mole of $BF_3.Et_2O$ to each mole of epoxy group of the epoxidized oil.

The same catalyst-monomer ratio applies to polymerization reaction using tetrafluoroboric acid as the catalyst. The catalysts were added drop-wise to the mixture of THF and epoxidized oil and the mixture was stirred continuously.

The co-polymerization of THF and epoxidized oil with $BF_3.Et_2O$ was conducted at desired temperature with nitrogen blanket for 24 hours. Preferably, the temperature of the polymerization is between 0° C. and 60° C. to avoid side reaction such as transesterification.

The polymerization was conducted for 24 hours to optimize yield of copolymer (PTHF). However, the polymerization can be stopped at any time between 5 minutes to 24 hours if desired or it can be prolonged to 3 days if desired.

The disclosed process of the present invention includes purifying steps to clean the chemical residue in the produced copolymers PTHF after the polymerization reaction to ensure the stability of the end product. The purifying steps include diluting the product with chloroform; washing the product with deionized water; neutralizing residue acids in the washed product with a base; and washing the neutralized product with deionized water until the pH of the neutralized product reaches 6.5 to 7.5. A further step involves drying the product over anhydrous magnesium sulfate, filter the product and removal of the organic solvent through rotary evaporator.

The properties of the copolymers PTHF is dependent on:
(i) type of epoxidized oil used as co-monomer;
(ii) mole ratio between epoxidized oil and THF;
(iii) amount of catalyst;
(iv) reaction temperature; and
(v) reaction time.

Typically, polymeric content of the purified copolymer PTHF ranges from 80% to 97%. The hydroxyl value ranges from 20 to 40 mg KOH/g sample. The number average molecular weight $M_n$ ranges from 25000 Da to 120000 Da.

The produced copolymers PTHF were used as raw material for the production of polyurethane and polyurea. For the production of polyurethane, there are two methods to utilize the copolymers as raw material. The first method is known one shot method, where the copolymers were mixed directly with diisocyanate and a chain extender to yield polyurethane. The one shot method was conducted at 60° C. for 24 hours with chloroform as the solvent. Examples of chain extender that could be used are 1,4-butanediol, diethylene glycol, dipropylene glycol and polyethylene glycol (PEG) of various molecular weight. The diisocyanate used in this invention was 4,4'-methylene diphenyl diisocyanate (MDI). Other diisocyanate that could be used are toluene diisocyanate, naphthalene diisocyanate, hexamethylene diisocyanate and isophorone diisocyanate.

The second method involved converting the copolymers PTHF to isocyanate terminated prepolymer by reacting the copolymer with excess MDI. The copolymer PTHF was dissolved in chloroform and was reacted with excess diisocyanate at 60° C. for 24 hours to yield the isocyanate terminated prepolymer. The targeted NCO % of the prepolymer was about 15%. Then, the prepolymer was reacted with diol (chain extender) to form polyurethane by using similar reaction condition as in the preparation of the prepolymer.

Polyurea can also be produced from the copolymers PTHF by first converting the copolymers PTHF to isocyanate terminated prepolymer and then reacting the prepolymer with diamine to yield the desired polyurea. The prepolymer is produced by using similar method as described above in the preparation of polyurethane's prepolymer. Then, the prepolymer is reacted with diamine such as Jeffamine D2000 or Jeffamine D400 to yield polyurea at 60° C. for 24 hours with chloroform as the solvent.

The following examples are intended to further illustrate the invention, without any intent for the invention to be limited to the specific embodiments described therein.

EXAMPLE 1

Epoxidized methyl oleate (EMO) (1 g, 3.2 mmol) was charged into 50 ml reaction vessel and anhydrous tetrahydrofuran (THF) (20 ml) was charged into the same vessel. The EMO was dissolved in THF and the mixture was stirred throughout the reaction. The reaction vessel was purged with nitrogen gas to remove air and moisture. The reaction vessel was blanketed with nitrogen gas throughout the reaction. The reaction temperature was kept at 20° C. Boron trifluoride-diethylether complex ($BF_3.Et_2O$, 48% $BF_3$ basis) (23 μL, 0.16 mmol) was added drop-wise into the reaction mixture within 10 minutes time frame. The reaction was kept at 20° C. for 24 hours. After 24 hours, the reaction mixture was poured into a separating funnel and chloroform (50 ml) was added to it. The reaction mixture was washed with deionized water (50 ml), neutralized with saturated sodium hydrogen carbonate solution (25 ml) and again washed with deionized water (25 ml). The organic layer was dried over anhydrous magnesium sulfate. The dried organic layer was filtered and the organic solvent was removed through rotary evaporator. The collected weight of the desired copolymer was 6.5 g. The copolymer was found to be in the form of an off-white solid at room temperature. Gel permeation chromatography shows that the polymeric content of the copolymer was about 97%. The resulting polymer has the following properties:

a) Hydroxyl value (mg KOH/g sample): 19.0
b) Number average molecular weight, $M_n$: 26000

EXAMPLE 2

The same reaction in Example 1 was repeated with epoxidized cocoa butter (1 g, 1.1 mmol) and the amount of anhydrous tetrahydrofuran used was 5 ml, while the amount of boron trifluoride-diethylether complex ($BF_3.Et_2O$, 48% $BF_3$ basis) used was 16 µL (0.11 mmol). The reaction was kept at 20° C. for 24 hours. The crude product was subjected to the same work up procedure as in Example 1. The collected weight of the desired copolymer was 2.5 g. The copolymer was an off-white solid at room temperature. Gel permeation chromatography shows that the polymeric content of the polymer was about 93%. The resulting polymer has the following properties:
a) Hydroxyl value (mg KOH/g sample): 20.0
b) Number average molecular weight, $M_n$: 31000

EXAMPLE 3

The same reaction in Example 1 was repeated with epoxidized palm olein (5 g, 5.7 mmol) and the amount of anhydrous tetrahydrofuran used was 100 ml, while the amount of boron trifluoride-diethylether complex ($BF_3.Et_2O$, 48% $BF_3$ basis) used was 14 µL (0.11 mmol). The reaction was kept at 20° C. for 24 hours. The crude product was subjected to the same work up procedure as in Example 1. The collected weight of the desired polymer was 14.92 g. The polymer was found to be in the form of an off-white solid at room temperature. Gel permeation chromatography shows that the polymeric content of the polymer was about 80%. The resulting polymer has the following properties:
a) Hydroxyl value (mg KOH/g sample): 22.0
b) Number average molecular weight, $M_n$: 56000

EXAMPLE 4

The same reaction in Example 1 was repeated with epoxidized rapeseed oil (1 g, 1.06 mmol) and the amount of anhydrous tetrahydrofuran used was 80 ml, while the amount of boron trifluoride-diethylether complex ($BF_3.Et_2O$, 48% $BF_3$ basis) used was 12 µL (0.085 mmol). The reaction was kept at 20° C. for 24 hours. The crude product was subjected to the same work up procedure as in Example 1. The collected weight of the desired polymer was 6.82 g. The polymer was found to be in the form of an off-white solid at room temperature. Gel permeation chromatography shows that the polymeric content of the polymer was about 96%. The resulting polymer has the following properties:
a) Hydroxyl value (mg KOH/g sample): 24
b) Number average molecular weight, $M_n$: 54000

EXAMPLE 5

The same reaction in Example 1 was repeated with epoxidized soybean oil (1 g, 1.06 mmol) and the amount of anhydrous tetrahydrofuran used was 100 ml, while the amount of boron trifluoride-diethylether complex ($BF_3.Et_2O$, 48% $BF_3$ basis) used was 12 µL (0.085 mmol). The reaction was kept at 20° C. for 24 hours. The crude product was subjected to the same work up procedure as in Example 1. The collected weight of the desired polymer was 9.75 g. The polymer was found to be in the form of an off-white solid at room temperature. Gel permeation chromatography shows that the polymeric content of the polymer was about 96%. The resulting polymer has the following properties:
a) Hydroxyl value (mg KOH/g sample): 25.0
b) Number average molecular weight, $M_n$: 115000

EXAMPLE 6

The same reaction in Example 1 was repeated with euphorbia oil (5 g, 5.5 mmol) and the amount of anhydrous tetrahydrofuran used was 150 ml, while the amount of boron trifluoride-diethylether complex ($BF_3.Et_2O$, 48% $BF_3$ basis) used was 16 µL (0.11 mmol). The reaction was kept at 20° C. for 24 hours. The crude product was subjected to the same work up procedure as in Example 1. The collected weight of the desired polymer was 17.19 g. The polymer was found to be in the form of an off-white solid at room temperature. Gel permeation chromatography shows that the polymeric content of the polymer was about 90%. The resulting polymer has the following properties:
a) Hydroxyl value (mg KOH/g sample): 25.0
b) Number average molecular weight, $M_n$: 108000

EXAMPLE 7

The same reaction in Example 1 was repeated with euphorbia oil (1 g, 1.1 mmol) and the amount of anhydrous tetrahydrofuran used was 30 ml, while the amount of tetrafluoroboric acid ($HBF_4$, 48% $HBF_4$ basis) used was 6 µL (0.044 mmol). The reaction was kept at 20° C. for 24 hours. The crude product was subjected to the same work up procedure as in Example 1. The collected weight of the desired polymer was 3.65 g. The polymer was found to be in the form of an off-white solid at room temperature. Gel permeation chromatography shows that the polymeric content of the polymer was about 97%. The resulting polymer has the following properties:
a) Hydroxyl value (mg KOH/g sample): 23.0
b) Number average molecular weight, $M_n$: 36000

EXAMPLE 8

The same reaction in Example 1 was repeated with epoxidised palm oil (1 g, 1.1 mmol) and the amount of tetrahydrofuran used was 20 ml, while the amount of tetrafluoroboric acid ($HBF_4$, 48% $HBF_4$ basis) used was 6 µL (0.044 mmol). The reaction was kept at 20° C. for 24 hours. The crude product was subjected to the same work up procedure as in Example 1. The collected weight of the desired polymer was 3.85 g. The polymer was found to be in the form of an off-white solid at room temperature. Gel permeation chromatography shows that the polymeric content of the polymer was about 97%. The resulting polymer has the following properties:
a) Hydroxyl value (mg KOH/g sample): 21.0
b) Number average molecular weight, $M_n$: 22500

EXAMPLE 9

Polymer from Example 3 (1 g) was reacted with 4,4'-methylene diphenyl diisocyanate (MDI) (1 g) at 60° C. for 24 hours with chloroform (9 ml) as solvent. The final isocyanate content (NCO %) of the prepolymer was determined to be about 15%. The prepolymer (1.5 g) was then reacted with diamine (Jeffamine D2000, 5.42 g) at 60° C. for 24 hours with chloroform (85 ml) as solvent to yield polyurea. The polyurea was poured into a mold and was heated at 60° C. for another 24 hours to remove the solvent and to form the desired product. The dry film of polyurea was demold and was left to cure at room temperature for 3 days. The polyurea film was flexible and semi-transparent

EXAMPLE 10

Polymer from Example 3 (1 g) was reacted with 4,4'-methylene diphenyl diisocyanate (MDI) (0.13 g) at 60° C. for 24 hours with chloroform (9 ml) as solvent to yield polyurethane. The polyurethane was poured into a mold and was heated at 60° C. for another 24 hours to remove the solvent and to form the desired product. The polyurethane was demold and was left to cure at room temperature for 3 days. The polyurethane was an elastomeric solid.

The invention claimed is:

1. A method to produce polytetrahydrofuran (PTHF) copolymer from epoxidized oil from natural sources and tetrahydrofuran wherein:
   the epoxidized oil is copolymerized in tetrahydrofuran in the presence of catalyst to produce the copolymer (PTHF), and
   the amount of tetrahydrofuran used in polymerization reaction is 1 to 100 times (w/v) the amount of epoxidized oil and/or the amount of catalyst used is between 0.01 mole to 0.1 mole to each mole of epoxy group of the epoxidized oil.

2. A method according to claim 1, wherein the epoxidized oil is made from any one or combination of palm oil, soybean oil, coconut oil, groundnut oil, safflower oil, linseed oil, corn oil, sunflower oil, olive oil, canola oil, cottonseed oil, rapeseed oil, tung oil, fish oil, lard, tallow, *euphorbia* oil, vernonia oil, or any derivatives thereof.

3. A method according to claim 1, wherein the moisture content of the epoxidized oil is 0.5% or below.

4. A method according to claim 1, wherein the oxirane oxygen content (OOC %) of the epoxidized oil ranges from 1.5% to 7%.

5. A method according to claim 1, wherein the catalysts used are boron trifluoride diethylether complex and tetrafluoroboric acid.

6. A method according to claim 1, wherein the polymerization of THF and epoxidized oil is conducted at temperature between 0° C. and 60° C.

7. A method according to claim 1, wherein the polymerization of THF and epoxidized oil is conducted for 5 minutes to 24 hours.

8. A method according to claim 1, wherein the PTHF copolymer has 80% to 97% polymeric content.

9. A method according to claim 1, wherein the PTHF copolymer has a hydroxyl value of 20 to 40 mg KOH/g sample.

10. A method according to claim 1, wherein the PTHF copolymer has a number average molecular weight $M_n$ of 22000 to 120000.

11. The method according to claim 1, wherein the PTHF copolymer is used as raw material for the production of polyurethane and polyurea.

12. A method according to claim 1, wherein the PTHF copolymer can be reacted with excess diisocyanate to produce isocyanate terminated prepolymer and subsequently the prepared prepolymer can be reacted with diol to produce polyurethane.

13. A method according to claim 1, wherein the PTHF copolymer can be reacted with excess diisocyanate to produce isocyanate terminated prepolymer and subsequently the prepared prepolymer can be reacted with diamine to produce polyurea.

14. A method according to claim 11, wherein the PTHF copolymer can be reacted with excess diisocyanate to produce isocyanate terminated prepolymer and subsequently the prepared prepolymer can be reacted with diol to produce polyurethane.

15. A method according to claim 11, wherein the PTHF copolymer can be reacted with excess diisocyanate to produce isocyanate terminated prepolymer and subsequently the prepared prepolymer can be reacted with diamine to produce polyurea.

16. A method for producing polytetrahydrofuran (PTHF) copolymer from epoxidized oil from natural sources and tetrahydrofuran, comprising:
   dissolving epoxidized oil in tetrahydrofuran; and
   copolymerizing at least a portion of the epoxidized oil and tetrahydrofuran in the presence of catalyst to produce the copolymer (PTHF), wherein:
   the epoxidized oil is dissolved in the tetrahydrofuran in a ratio of 1:1 (w/v) to 1:100 (w/v) and/or the PTHF copolymer has a hydroxyl value of 20 to 40 mg KOH/g sample.

17. A method to produce polytetrahydrofuran (PTHF) copolymer from epoxidized oil from natural sources and tetrahydrofuran wherein:
   the epoxidized oil is copolymerized in tetrahydrofuran in the presence of catalyst to produce the copolymer (PTHF); and
   the (PTHF) copolymer has at least one characteristic selected from:
      a polymeric content of 80% to 97%,
      a hydroxyl value of 20 to 40 mg KOH/g sample, or
      a number average molecular weight $M_n$ of 22000 to 120000.

18. A method according to claim 17, wherein the epoxidized oil is made from any one or combination of palm oil, soybean oil, coconut oil, groundnut oil, safflower oil, linseed oil, corn oil, sunflower oil, olive oil, canola oil, cottonseed oil, rapeseed oil, tung oil, fish oil, lard, tallow, euphorbia oil, vernonia oil, or any derivatives thereof.

* * * * *